June 17, 1958     D. L. LOEW ET AL     2,839,173
PREPAID ENTERTAINMENT DISTRIBUTION SYSTEM
Original Filed Jan. 19, 1950     8 Sheets-Sheet 1
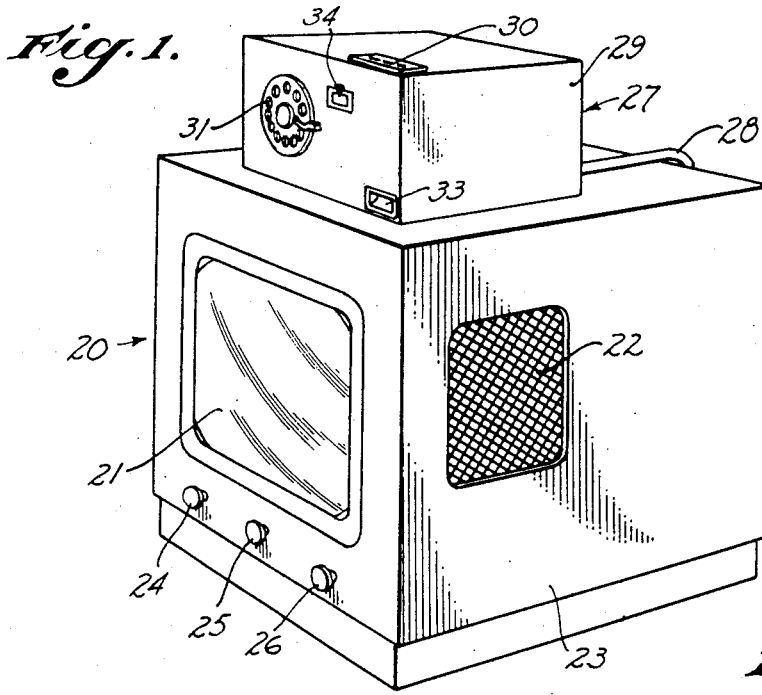
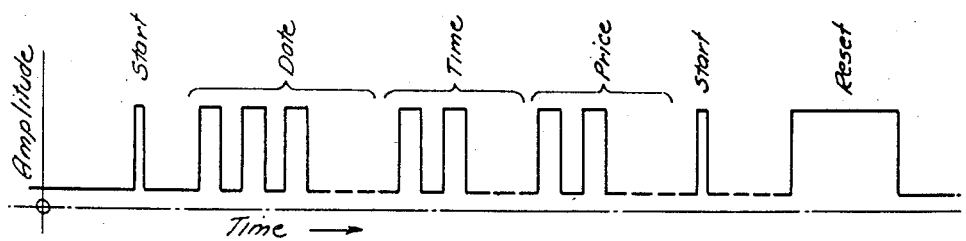
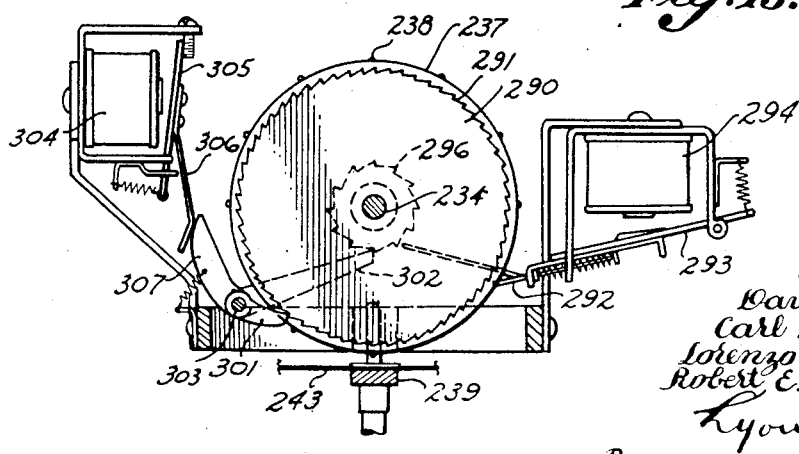
Inventors
David L. Loew
Carl Leserman
Lorenzo Del Riccio
Robert E. Gottfried
Lyon & Lyon
By     attorneys

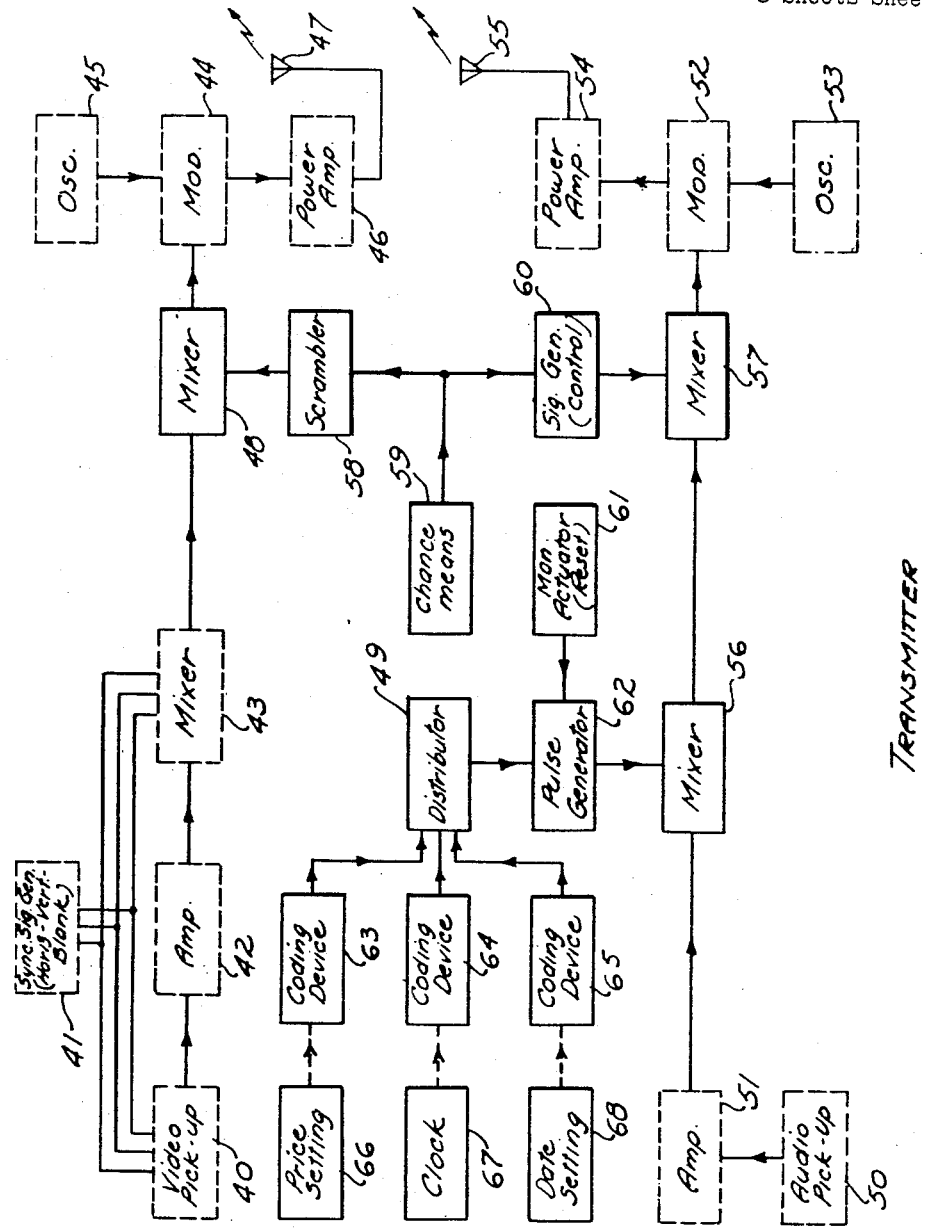

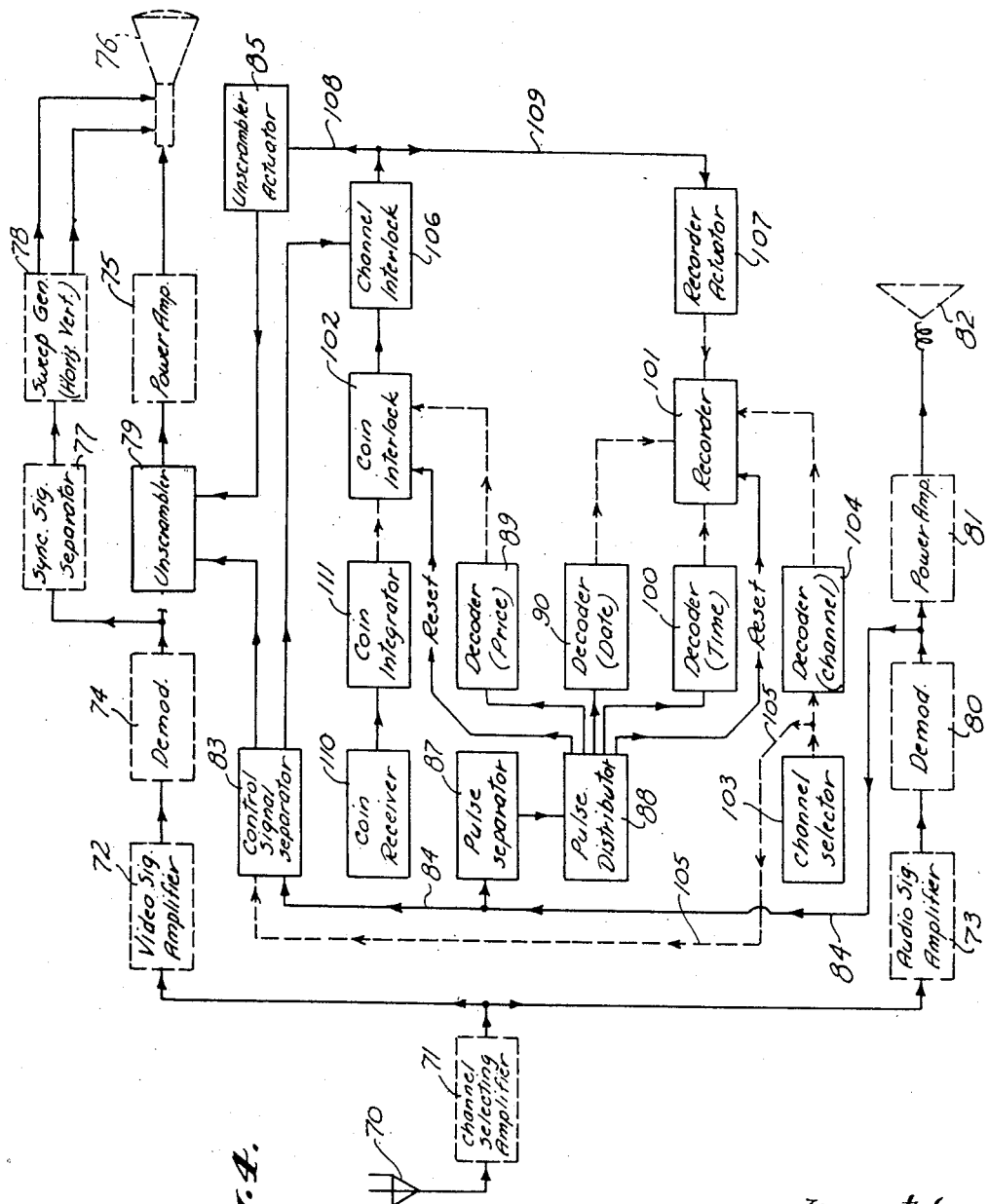

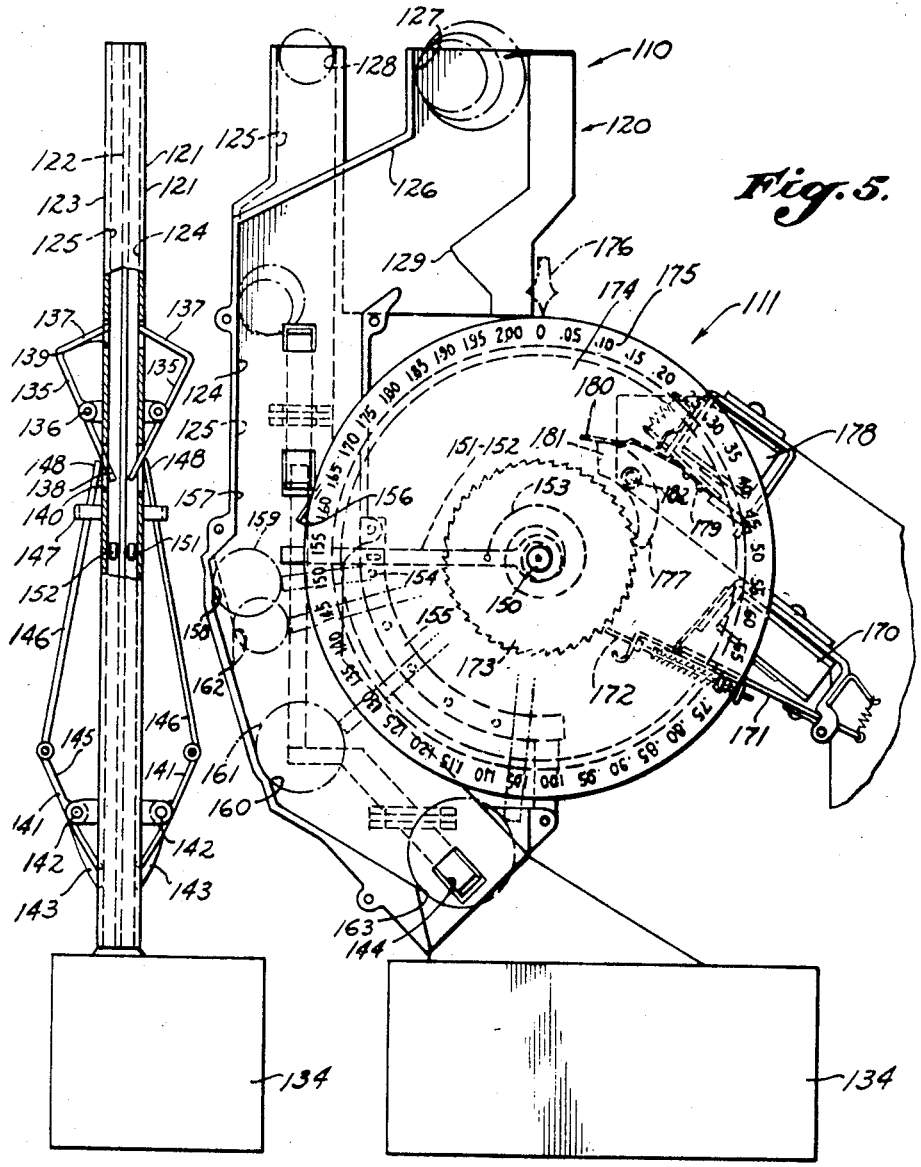

June 17, 1958        D. L. LOEW ET AL        2,839,173
PREPAID ENTERTAINMENT DISTRIBUTION SYSTEM
Original Filed Jan. 19, 1950        8 Sheets-Sheet 6
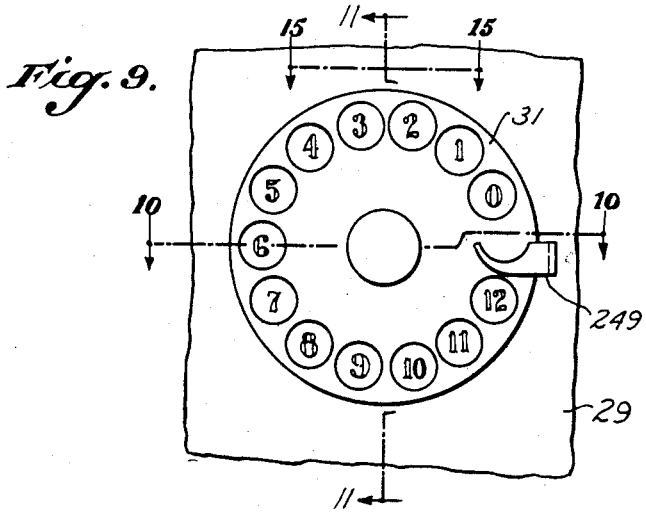
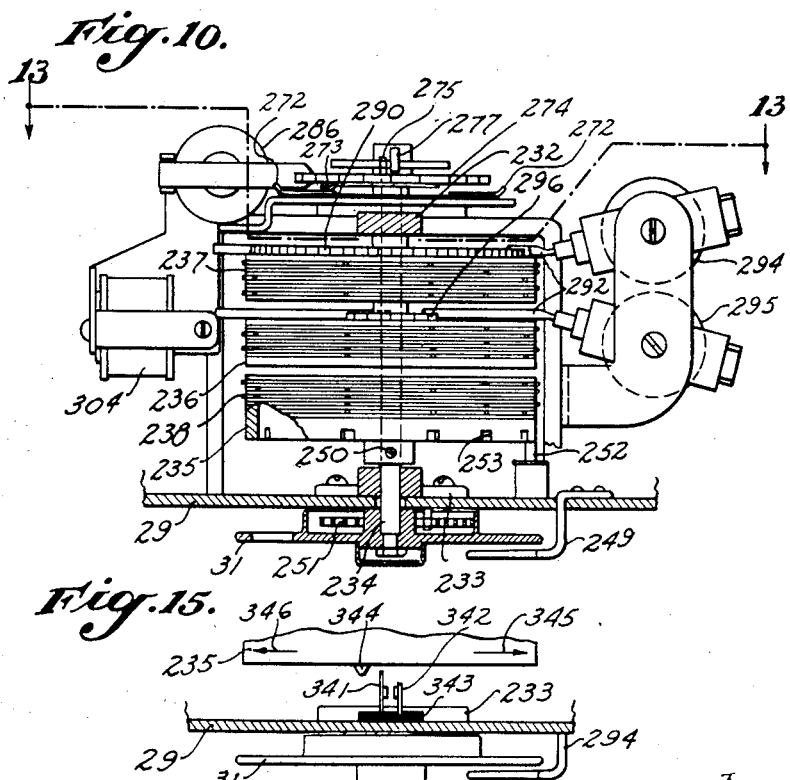
Inventors
David L. Loew
Carl Leserman
Lorenzo Del Riccio
Robert E. Gottfried
By Lyon & Lyon
Attorneys

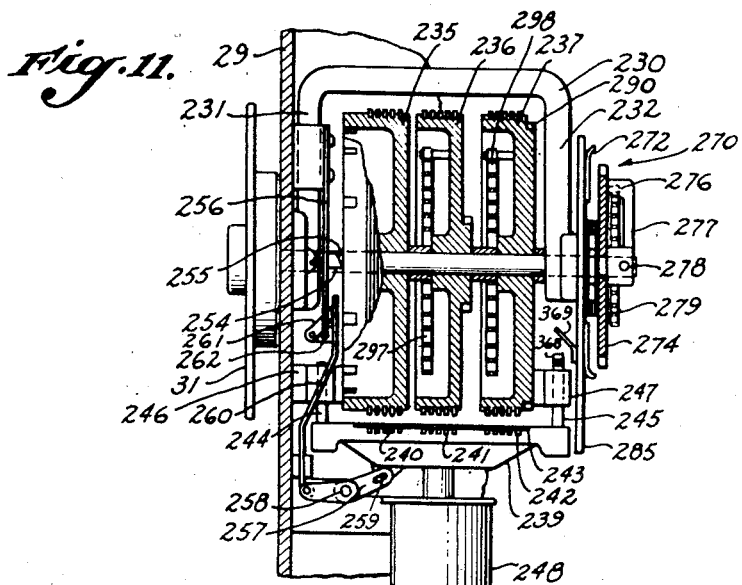
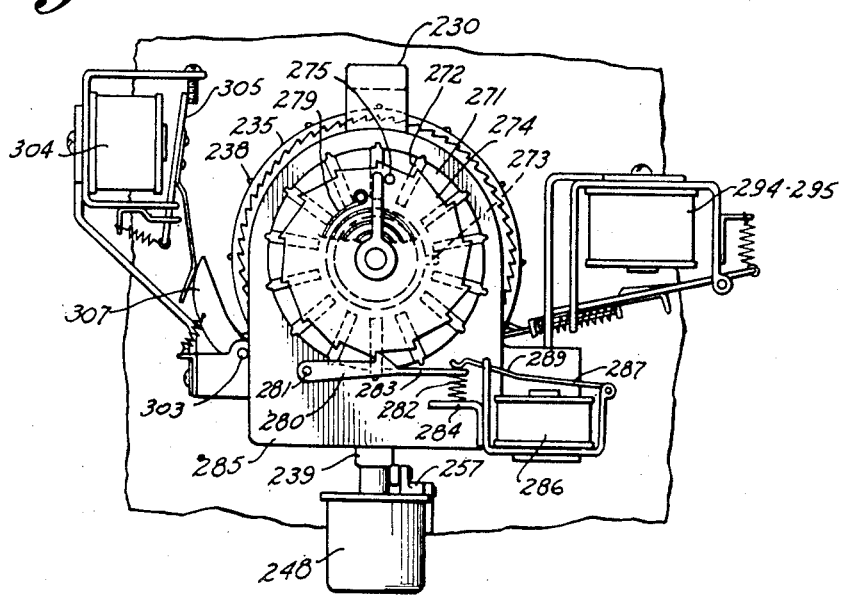

June 17, 1958     D. L. LOEW ET AL     2,839,173
PREPAID ENTERTAINMENT DISTRIBUTION SYSTEM
Original Filed Jan. 19, 1950     8 Sheets-Sheet 8

Inventors
David L. Loew
Carl Leserman
Lorenzo Del Riccio
Robert E. Gottfried
By Lyon & Lyon
Attorneys

United States Patent Office 2,839,173
Patented June 17, 1958

2,839,173

PREPAID ENTERTAINMENT DISTRIBUTION SYSTEM

David L. Loew, Beverly Hills, Carl Leserman, Los Angeles, Lorenzo Del Riccio, Beverly Hills, and Robert E. Gottfried, West Los Angeles, Calif., assignors to International Telemeter Corporation, a corporation of Delaware Original application January 19, 1950, Serial No. 139,358, now Patent No. 2,769,023, dated October 30, 1956. Divided and this application September 1, 1951, Serial No. 244,774

9 Claims. (Cl. 194—9)

This invention relates to prepaid entertainment distribution systems, and has particular reference to a system for distributing aural and visual entertainment to a plurality of remotely situated receiving and reproducing stations, the prepayment being effected by coin collecting control apparatus at each such station. The system finds particular utility when employed for the distribution of radio and television programs.

In the radio broadcasting industry it has been possible to operate extensive program distribution systems on a profitable basis through the use of the system as an advertising medium. In the distribution of television programs, the experience has been otherwise, and advertising revenues are not sufficient to permit the profitable distribution of high quality programs. The inadequacy of advertising revenues is due in part to the higher cost of preparing and presenting programs of adequate entertainment value, and due in part to the more limited area covered by television broadcasting stations as distinguished from radio broadcasting stations. Although some thought has been given to the use of coin collecting receivers as a means for obtaining payment from the public for the entertainment received by them, the coin collecting systems devised prior to this invention have not been satisfactory. For example, the amount of money required to be deposited in the coin collecting device is in no way related to the quality or duration of the program received. Ordinary coin collecting mechanisms provide for a definite time of operation of the receiver upon the deposit of a specified coin. This does not take into account the differing duration of various programs, nor the varying quality and therefore the varying value to the public of the various programs distributed. Furthermore, ordinary coin collecting receivers do not provide for the free reproduction of certain programs, and finally, when such a receiver is used for the reception of broadcasts from a plurality of transmitting stations, there is no equitable way in which the monies received can properly be divided among the various broadcasting stations nor among the various suppliers of entertainment broadcast by those stations.

The present invention provides a prepaid entertainment distribution system which is particularly adapted for use with television broadcasting systems. Briefly described, the system of the present invention includes coin collecting control apparatus adapted to be connected to any conventional television receiver wherever located and permits such receiver to be used in the normal way to receive any programs which are distributed for free consumption by the viewing and listening public. Certain programs, however, will be distributed as unconventional coded transmissions and therefore secret or protected transmissions so as to be unintelligible when an attempt is made to receive such programs on ordinary television receivers. For purposes of definition standard or conventional coded transmissions or signals are those in accordance with standards in use in the particular area, as for example, the field, frame and line rates, video amplitudes and polarities prescribed by the Federal Communications Commission for black and white television in the United States; and non-standard or non-conventional coded signals or transmissions are defined as those which differ in one or more respects from a conventional coded signal and will therefore not reproduce program material on an unmodified conventional receiver. Upon the deposit of a specified sum of money in the coin collecting apparatus the otherwise secret transmissions will be cleared to render the program intelligible. The coin collecting apparatus includes a price controlling mechanism so that different programs may be priced differently, the programs of higher quality and longer duration requiring the deposit of a greater amount of money than do the shorter programs of lower quality. Also, the coin collecting apparatus is associated with a recording device for producing a permanent record of all of the data necessary to effect a proper distribution of the deposited monies among the various organizations disseminating the various secret programs.

It is, accordingly, an object of this invention to provide an entertainment distribution system of the prepaid type which overcomes the disadvantages hereinbefore mentioned by providing a coin collecting control apparatus having the attributes above described.

It is also an object of this invention to provide a distribution system of the character mentioned in the preceding paragraphs which includes means at one or more transmitting stations for transmitting entertainment material to a plurality of receiving and reproducing stations and for rendering the entertainment material reproducible if coins of the proper denomination are deposited in the coin collecting devices at said receiving stations.

It is another object of this invention to provide an entertainment distribution system of the character hereinbefore mentioned in which the coin collecting apparatus is responsive to control signals originating at the transmitting station and determining for each program transmitted the amount of money required to be deposited to render that program intelligible upon reception.

It is a still further object of this invention to provide a system of the character hereinbefore described wherein the coin collecting apparatus includes a recording device operating automatically to keep a permanent record of all data necessary to a proper distribution of the deposited coins among the various distributors of the secret programs.

It is also an object of this invention to provide a system of the character hereinbefore described and adapted particularly for the distribution of television programs, in which the coin collecting control apparatus is so arranged as to permit its attachment to any of the various types of conventional television receivers so as to make possible the ready installation of the apparatus in homes and like places already having receivers installed therein.

It is another object of this invention to provide a system of the character hereinbefore mentioned which includes a coin integrating device operating in response to the deposit of a plurality of coins of different denominations to determine and indicate the aggregate monetary value of all coins so deposited.

It is a still further object of this invention to provide a system of the character mentioned in the preceding paragraphs which includes a coin interlock functioning as a comparator to determine whether the total monetary value of the coins deposited is equal to the determined price of the program selected, and operating to maintain the secrecy of the program until the proper amount of money is so deposited.

It is also an object of the present invention to provide an entertainment distribution system of the character described in the preceding paragraphs in which the recording device is responsive to indicating signals originating at the transmitting station and indicating the date, time and price of the transmission.

It is also an object of this invention to provide a system of the character hereinbefore described which includes at the receiving station a signal distributor of novel construction for distributing and allocating the received indicating signals to the different instrumentalities to be controlled thereby.

It is an additional object of this invention to provide a system of the character hereinbefore mentioned which is particularly adapted to use with existing entertainment distribution systems by being so constructed and arranged as to require the use of a minimum number of additional instrumentalities, and so as to employ therefor instrumentalities of simple and inexpensive construction.

The present application is a division of our copending patent application, Serial No. 139,358 filed January 19, 1950 for Prepaid Entertainment Distribution System, now Patent No. 2,769,023, issued October 30, 1956.

Other objects and advantages of this invention will be apparent from a consideration of the following specification, read in connection with the accompanying drawings, wherein:

Figure 1 is a perspective view illustrating a conventional television receiver having connected thereto a coin collecting apparatus of the type used in the system of this invention;

Figure 2 is a block diagram illustrating functionally the apparatus constituting a transmitting station forming a part of the entertainment distribution system;

Figure 3 is a graph showing the character and timed arrangement of various control and indicating pulses which are generated at the transmitting station and transmitted to all receiving stations;

Figure 4 is a block diagram illustrating functionally the apparatus employed at the receiving stations;

Figure 5 is a side elevational view of the coin collecting and coin integrating apparatus used at the receiving station shown in Figure 1;

Figure 6 is an end view of the apparatus shown in Figure 5 with parts broken away and shown in section to illustrate additional details of construction;

Figure 9 is a fragmentary elevational view illustrating the appearance of a station or channel selector used at the receiving stations;

Figure 10 is a sectional view taken substantially along the line 10—10 of Figure 9 and illustrating the construction of the recording apparatus at the receiving station;

Figure 11 is a sectional view taken substantially along the line 11—11 of Figure 9 and illustrating additional details of construction of the recording mechanism;

Figure 12 is an end elevational view of the apparatus shown in Figures 10 and 11 and showing the construction of one of the control elements;

Figure 13 is a sectional view taken substantially along the line 13—13 of Figure 10 and illustrating the drive mechanism for one of the recording devices;

Figure 15 is a fragmentary plan view taken substantially as indicated by the line 15—15 of Figure 9 and illustrating the construction of a resetting switch.

Figure 7:
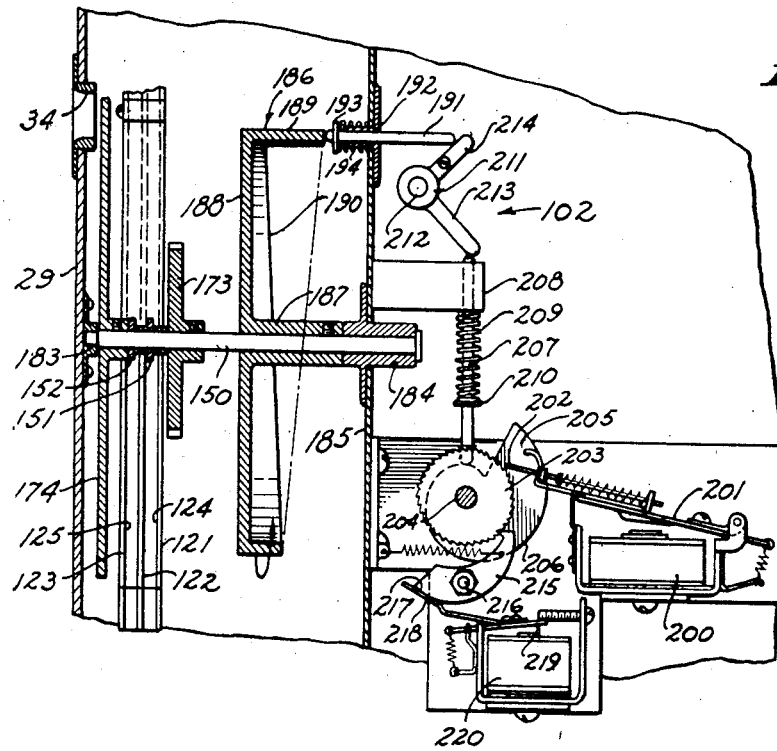
Figure 7 is a vertical sectional view through the coin collecting apparatus illustrating the construction and arrangement of the parts constituting a price decoder and coin interlock used to control the operation of the television receiver.

The entertainment distribution system of this invention comprises one or more transmitting stations at which the entertainment material originates and a plurality of remotely situated receiving stations at which the entertainment material is received and reproduced. The transmission, which includes the entire composite signals, of the material to the receiving stations may be over metallic electric circuits if desired, but the system is particularly adapted to the use of electromagnetic radiations such as are employed as the medium of transmission in the radio and television arts. The material transmitted consists of the entire composite signal including decoding signals as defined hereinafter. While the invention is adapted for use with many types of entertainment distribution systems, it is particularly adapted for use with radio or television broadcasting systems, and for this reason, the system has been so arranged as to use existing receiving station installations with a minimum of change or adaptation of the existing receiving apparatus.

Referring to the drawings, there is shown in Figure 1 a typical receiving station which, according to the preferred embodiment of the invention, includes a television receiving apparatus 20. A television system has been chosen for illustration herein as representative of the distribution of combined aural and visual entertainment. While a television system has been chosen for the purpose of illustration herein, it will be appreciated that the invention is equally applicable to other types of entertainment distribution systems.

As shown in Figure 1, the television receiver 20 is of usual and conventional construction, including an image reproducing device 21 upon which the visual portion of the entertainment is displayed, and an aural reproducing device 22 from which emanates the audible portion of the entertainment. These devices and the ancillary apparatus are enclosed within a suitable housing 23 upon the forward face of which are mounted control knobs 24, 25 and 26 used to control the operation of the apparatus, the knob 25, for example, constituting a selecting means for selecting the program channel desired to be received.

In addition to the receiver 20, the system of this invention employs an attachment device 27 which is placed at a convenient location, as for example, on top of the cabinet 23 and connected to the apparatus within the cabinet as by means of a cable 28. The attachment device 27 includes a coin actuated control mechanism and may include a small housing 29 for enclosing the various instrumentalities employed. Coin slots 30 are provided for the insertion of coins of appropriate denominations, and a selecting device 31, similar in appearance to a conventional telephone dial, is used in conjunction with knob 25 for the selection of the program desired to be received. A coin return chute 33 may be provided for receiving rejected coins. The amount of money deposited in the coin slots 30 is indicated through an indicating opening 34.

As will be apparent from the ensuing description, the coin collecting apparatus 27 does not interfere with the normal operation of the television receiver 20 when the receiver is tuned to a channel carrying a conventional television program. However, should the receiver 20 be tuned to a channel carrying a secret program, the entertainment material reproduced by the receiver will be unintelligible until that same channel is selected by the selector 31 and the proper amount of coins is deposited in the coin slots 30. The way in which the transmitting apparatus is arranged to provide for such functioning will be apparent from a consideration of Figure 2.

Figure 2 is a block diagram illustrating functionally the transmitting apparatus, it being understood that the portion of the system shown in Figure 2 constitutes one transmitting station operating on one assigned channel. The entire system contemplates the use of a number of such transmitting stations, each operating upon its own assigned channel so as to provide a choice of programs to users of the system.

In Figure 2 the apparatus normally included in a television transmitter is represented by rectangles drawn in dashed lines. The additional apparatus constituting the means for preserving secrecy and the means for setting or controlling the coin collecting devices at all of the receiving stations are shown in solid lines. Electrical functions are represented by solid lines joining the rectangles, and dotted lines are used to indicate mechanical functions.

As is well known, the conventional television transmitter constitutes two separate transmitters, one operating on one carrier frequency, to transmit the video portion of the program, and the other operating on a different carrier frequency serving to radiate the audible portion of the program.

The conventional video portion of the transmitting apparatus comprises a video pick-up 40 of the electronic scanning type such as is termed an "Iconoscope." The scanning of the subject is controlled by suitable horizontal and vertical scanning signals and blanking signals derived from a synchronizing signal generator 41. The output of the video pick-up 40 is amplified as by an amplifier 42 and fed to a mixer 43 where control signals corresponding to the horizontal vertical and blanking signals are added to the video signal for the purpose of synchronizing the operation of the image reproducer in the receiving apparatus. The combined signals are normally applied to a modulator 44 which serves to modulate a carrier frequency generated by an oscillator 45, the modulated carrier frequency being suitably amplified in a power amplifier 46 and applied to a transmitting antenna 47.

The usual audio portion of a television transmitter comprises an audio pick-up 50 such as a conventional microphone, the output of which is amplified by an amplifier 51 and applied to a modulator 52. The modulator 52 serves to modulate a carrier frequency generated as by an oscillator 53, the modulated carrier frequency being suitably amplified by a power amplifier 54 and radiated from an antenna 55.

According to the present invention, mixers 56 and 57 are interposed between the amplifier 51 and the modulator 52, and a mixer 48 is interposed between the video mixer 43 and modulator 44. The mixers 48, 56 and 57 are used to add to the conventional television signals certain control and secrecy preserving signals which are generated by apparatus now to be described, and which are used for the purpose of preserving secrecy of the transmissions and for controlling the operations of the coin collecting apparatus at the receiving stations.

In the form of the invention chosen for illustration herein, secrecy is preserved by destroying the visual portion of the transmission. This is accomplished through the use of a "scrambler" 58 which is coupled to the mixer 48 and serves to so modify the signals passed from the mixer 43 as to render them unintelligible when received by a conventional television receiver. The scrambler 58 may comprise any one of a number of known scrambling devices for preserving secrecy of television transmissions. Scrambling devices of this type are described, for example, in the following United States Letters Patent: Parker, No. 1,461,783; Cassel, No. 1,870,490; Dillenback, No. 2,403,059; and Friedman, No. 2,465,367. The particular scrambling system selected is not critical providing the scrambling of the conventional coded signals is of a controlled character such that the resulting unconventional coded signals may be "unscrambled" and rendered intelligible at the television receiver.

The scrambler 58 is arranged to be controlled by a chance means 59 serving to vary some one parameter of the scrambling function so as to further increase the secrecy of the transmissions. The chance means may comprise a tape transmitter of the character suggested in the United States Letters Patent to Parker, No. 1,461,783. The chance means 59 is also used to simultaneously control a signal generator 60 which feeds the mixer 57 so as to add to the signal radiated from the antenna 55 control or decoding signals corresponding to the scrambling signals used to produce an unconventional coded signal or transmission to preserve secrecy of the video transmissions. For purposes of definition the term decoding signal or signals is one which is received as a part of the composite transmitted television signal and which is operative to control appropriate portions of the receiver in such manner that the transmitted program material is properly reproduced. In order that these control signals may be separated from the audio signals reproduced as sound in the receiver and in order to prevent any interference with the normal enjoyment of the audible portion of the program, the control signals produced by the generator 60 may be of a super audible frequency lying outside the normal hearing range, or may be used to modulate an inaudible subcarrier applied as a modulation to the sound carrier.

The mixer 56 serves to add to the audio portion of the program certain pulse signals produced by a pulse generator 62. Like the signals produced by the signal generator 60, the pulse signals produced by the pulse generator 62 may be of supersonic frequency or may be applied as a modulation to an inaudible sub-carrier. The pulse generator 62 is under the control of three coding devices 63, 64 and 65, connected through a distributor 49 which serves to connect the coding devices to the pulse generator one at a time in a timed sequence so as to correspondingly operate the pulse generator 62. The coding device 63 is connected to a manual setting mechanism 66 which may be so adjusted as to cause the coding device to actuate the pulse generator 62 and produce pulses representative of the price of the program being transmitted to thereby indicate at the receiving stations the amount of money which must be deposited in order to receive the transmissions. The coding device 64 is similarly controlled by a clock 67 so as to transmit to all of the receiving stations signals representative of the time of day the signals are transmitted. The coding device 65 is controlled by another manual setting device 68 which is so arranged as to cause the pulse generator 62 to produce signals representative of the date of the transmissions.

The pulses produced by the generator 62 need not be distinguishable one from the other. For example, the price of the program may be represented by the number of pulses in a particular series. Using for example, an arbitrary unit of measurement of five cents, the price of the program can be indicated over the range from five cents to two dollars through the use of from one to forty pulses following each other in rapid succession. The hour of the day can similarly be indicated by a number of pulses ranging in number from one to twelve. In like manner the date may be indicated by a series of pulses ranging in number from one to sixty and corresponding to an arbitrary numbering of the days of a selected sixty-day period. The pulse generator 62 is also provided with a manual actuator 61 which may be manually operated from time to time to transmit resetting control signals to all of the receiving stations, as for example, upon the conclusion of a program for the purpose of resetting the coin controlling apparatus and making it available for the deposit of additional coins to provide for reception of the next program.

The pulses produced by the pulse generator 62 are represented graphically in Figure 3. The first pulse in each series is a starting signal indicating the commencement of the series and preferably comprises a signal short duration pulse such as is represented by the legend "Start" in Figure 3. A short time after the "start" pulse, a group of "date" pulses are transmitted, the number of such pulses depending upon the date of transmission as above described. The "date" pulses are all identical and each has a much longer duration than does the "start" pulse. The "date" pulses are followed by a group of "time" pulses and a group of "price" pulses, all identical to the "date" pulses and depending in number upon the time and price of the transmission as above described. The groups of pulses are separated by a short rest period, and after a similar rest period following the group of "price" pulses the sequence is repeated beginning with another "start" pulse. The "reset" pulse which results from operation of the actuator 61 differs from the other pulses only in having a duration which is a number of times greater than the duration of the "date," "time," and "price" pulses, and in occurring only upon operation of the manual actuator 61 instead of occurring at regular intervals as do the other pulses.

As will be made apparent hereinafter, the control signals injected by the generator 60 and the pulses injected by the pulse generator 62 are withdrawn from the audio signal at the receiving end and used to control the operation of the receiver coin collecting apparatus.

The apparatus used at each of the various receiving stations is illustrated functionally by the block diagram constituting Figure 4 of the drawings. As in Figure 2, the apparatus forming the usual and conventional television receiving apparatus is shown in dotted lines, rectangles drawn in solid lines being employed to indicate the functions performed by the various instrumentalities of the coin collecting control apparatus including the recording and unscrambling means. Electrical functions are represented by solid lines joining the rectangles, and dotted lines are used to indicate mechanical functions.

The radiated composite television signals which include the decoding signals are picked up by a receiving antenna 70 and passed through a channel selecting amplifier 71 serving to amplify and to select, from a group of available channels, the one carrying the program desired to be received. The output from the amplifier 71 is divided, the video signal being applied to a video signal amplifier 72 and the audio signals being applied to an audio signal amplifier 73. The video signals amplified by the amplifier 72 are demodulated by a demodulator 74 and are normally applied to a power amplifier 75 which drives an image reproducing device 76 which may be of the conventional cathode ray tube type.

The output of the demodulator 74 is also applied to a synchronizing signal separator 77 which serves to extract the synchronizing signals produced at the transmitting station. The synchronizing signal separator 77 controls the operation of a sweep generator 78 producing suitable control potentials for controlling the horizontal and vertical sweeping functions of the cathode ray tube 76.

Between the demodulator 74 and the power amplifier 75 is shown an "unscrambler" or decoder or decoding means 79. While the unscrambler 79 is shown as being connected between the demodulator 74 and power amplifier 75, it will be appreciated that in certain cases the unscrambler 79 may merely be connected to the circuit interconnecting the elements 74 and 75, the precise mode of connection of the unscrambler 79 to the balance of the apparatus depending entirely upon the type of scrambling system employed.

The audio signals which are amplified by the audio signal amplifier 73 are detected by a demodulator 80 and applied to a power amplifier 81 which is used to drive a sound reproducing device 82 such as a conventional loud speaker.

The unscrambler 79 is controlled by a control signal separator 83, the electrical input to which is connected, as represented at 84, to the output of the audio demodulator 80. It will be recalled that the audio channel carries inaudible control signals generated at the transmitter by the signal generator 60. These signals are separated from the balance of the program by the signal separator 83 and are used to so operate the unscrambler 79 in synchronism with the variable operation of the transmitter scrambler 58 as to effect an unscrambling of the video portion of the program and thus render the received transmissions intelligible. The unscrambler 79 is rendered operative by the energization of an actuator 85 which is in turn under the joint control of a coin collecting apparatus and the control signal separator 83.

The description of the coin collecting apparatus and the other instrumentalities shown in Figure 4, and their mode of operation, may be better understood by assuming certain conditions of operation, and tracing the resulting functions of each of the devices.

Assuming that through newspaper notices or other publications giving the details of the various television programs available, a user of the television receiver has determined that he wishes to see and hear the program being broadcast on a certain channel, the receiver 20 is accordingly placed in operation and the desired channel is selected in the usual manner; the presentation of the visual portion of the program will be unintelligible due to the scrambling of the video signals effected at the transmitter. The audio signals may or may not be intelligible, depending upon the type of scrambling system employed, it being understood that while only scrambling of the video channel has been described herein, it falls within the scope of this invention to scramble also the audio channel.

The connection 84 from the audio demodulator 80 applies to a pulse separator 87, the coded pulses representative of the price of the program, and the date and time of the transmission. The pulse separator 87 operates to extract from the audio signal the mentioned pulses and to apply them to a pulse distributor 88 which operates to apply the three groups of pulses to decoders 89, 90 and 100. The decoders 90 and 100 receive the date and time pulses from the distributor 88, and the output of these decoders is applied to a recorder 101 so as to pre-set a recording apparatus to the proper date and time. It will be understood that the recorder 101 is merely pre-set in this way and that the actual operation of making a permanent record is deferred until the conclusion of the sequence of operations, as will become more apparent hereinafter.

The price decoder 89 receives the price pulses from the distributor 88 and produces signals which are applied to a coin interlock 102 so as to introduce into that device as one parameter the price of the program received by the receiver 20.

After tuning the receiver 20, the user of the system next manipulates the dial 31 to set a channel selector 103 to the channel which has been tuned in on the receiver 20. The channel selector 103 is connected to a decoder 104 which is operated thereby to pre-set the recorder 101 to the selected channel. The channel selector 103 is also connected as indicated at 105 to the control signal separator 83 to so adjust the separator 83 as to respond to the unscrambling control signals radiated by the selected channel. It will be understood that each of the various transmitting stations transmit control signals on different frequencies or of different character, so that it is necessary to tune or adjust the control signal separator 83 in accordance with the channel selected for reception in order to effect an unscrambling of the received signals, and such tuning or adjustment is accomplished by the mechanical link 105.

The output of the control signal separator 83 is applied to the unscrambler 79, but this device remains inoperative until the actuator 85 is energized. A signal resulting from the adjustment of the control signal separator 83 is applied as indicated to a channel interlock 106 to complete a circuit from the coin interlock 102 to the unscrambler actuator 85 and to a recorder actuator 107 as is represented by the lines 108 and 109 respectively, so that the actuators 85 and 107 may be controlled by the coin interlock 102.

The user of the system, having been advised of the price of the selected program, either by published announcements in newspapers and the like, or through oral and/or visual announcements on preceding programs, then deposits in a coin receiver 110 the requisite number of coins. The coin receiver 110 is connected to a coin integrator 111 which serves to totalize the monetary value of all of the coins deposited. The coin integrator 111 is coupled to the coin interlock 102 which then operates to compare the monetary value of the coins deposited with the price of the program as represented by the output of the decoder 89.

Assuming that the proper amount of money has been deposited in the coin receiver, the coin interlock 102 will determine the correspondence between the price of the program and the amount of money deposited, and transmit a signal through the channel interlock 106 to the unscrambler actuator 85 to cause that device to render the unscrambler 79 operative, and render the entertainment produced by the receiver 20 intelligible.

The control signal applied to the recorder actuator 107 causes that device to operate the recorder 101, so as to make a permanent record of the data pre-set into the recording device as previously described. The recorder accordingly makes a permanent record of the channel selected and of the date and time the selection was made. This information, together with the information available at the various transmitting stations of the price of the various programs transmitted provides all of the data necessary for a proper allocation among the various transmitting stations of the monies deposited in the coin receiver 110.

At the conclusion of the program paid for by the coins deposited in the coin receiver 110, the transmitter manual actuator 61 is manipulated to transmit a resetting signal. This signal is separated from the audio signal by the pulse separator 87 and distributor 88 and applied to the coin interlock 102 so as to restore that device to its initial position and consequently deenergize the unscrambler actuator 85. The program subsequently transmitted on the selected channel will therefore be unintelligible until the required number of coins is deposited in the coin receiver 110.

The resetting signal is also applied to the recorder 101 so as to ready that device for the reception of a new group of signals to properly pre-set the recording apparatus the next time the apparatus is used.

Attention is directed to the fact that the coin control apparatus just described does not in any way interfere with the normal use of the receiving apparatus 20. If, for example, during the presentation of a lengthy paid program, the user desires to briefly receive a free program such as a scheduled news broadcast or the like, the receiver 20 may be tuned to the free program, and then retuned to the program paid for without interrupting the operation of the system. Should the operator tune to a different paid program, however, the same will be unintelligible due to the scrambling of the program until the coresponding channel is selected on the selector 103 and the requisite number of coins are deposited in the coin receiver 110.

With the exception of the channel selector, the recorder and its cooperating devices, and the interlocks together with the coin collecting mechanism, the instrumentalities above mentioned may be of usual and conventional construction.

The coin receiver 110 and coin integrator 111 are illustrated in detail in Figures 5 and 6 as including a coin chute mechanism represented generally by the reference character 120. The coin chute 120 is defined by three spaced parallel places 121, 122 and 123 defining therebetween two coin channels 124 and 125. The coin channel 124 is offset at its upper end as shown at 126 and terminates in a coin receiving aperture 127 sized to receive five cent, twenty-five cent, and fifty cent pieces. The coin channel 125 is not offset but extends upwardly and terminates in a coin receiving aperture 128 sized to receive ten cent pieces only.

An opening 129 in the lower edge of the off-set chute portion 126 is sized to pass a penny but prevent the passage of a five cent piece. This opening is connected by a suitable chute (not shown) to the coin return opening 33 shown in Figure 1, so that pennies placed in the coin receiving aperture 127 are rejected.

The two coin channels 124 and 125 lead past the coin integrating mechanism 111 to be described hereinafter and terminate in a coin box 134 where the deposited coins are retained until removed by a duly authorized collector.

The coin channels 124 and 125 are each provided with an escapement mechanism for so controlling the passage of the coins through the channels as to hold each subsequently deposited coin at the upper end of the channel until the next preceding coin has passed completely through the channel and has been received in the coin box 134. This mechanism may comprise a bell crank 135 pivoted as at 136 and including arm portions 137 and 138 which are passed through apertures 139 and 140 in the coin channel sidewalls so as to engage a coin passing along the channel. The normal position of the escapement arm 135 shown in Figure 6 allows the first deposited coin to pass the arm portion 137, but disposes the arm portion 138 in a position to be engaged by the falling coin. This engagement will rotate the bell crank 135 in a clockwise direction so as to move the arm portion 137 into the coin channel 135 and provide a stop upon which a subsequently deposited coin will rest.

A second lever 141 is pivoted as at 142 in a position disposing a lower end 143 thereof in the coin channel 125, the portion 143 extending into the channel through a suitable aperture 144 formed in the coin channel sidewall. The opposite end 145 of the lever 141 is pivotally connected to a push rod 146 guided for sliding movement in an apertured bracket 147 which positions the upper end 148 of the push rod 146 in overlying relation to the lower arm portion 138 of the upper bell crank 135.

As the coin passes downwardly through the coin channel 125, its engagement with the lower end portion 143 of the lever 141 will cause that lever to move in a clockwise direction and will move the lower end of the push rod 146 upwardly and to the right as viewed in Figure 6 causing the upper end 148 of the push rod 146 to move upwardly and push the lower end 138 of the lever 135 into the aperture 140 to the position shown in Figure 6. This accompanied by a withdrawal of the portion 137 from the coin channel to permit the next coin to pass downwardly through the channel.

As the next coin engages the lower portion 138 of the bell crank 135, the upper portion 137 is again inserted into the channel to hold subsequently deposited coins and remains in that position until restored to its initial position by the engagement of the coin with the lower portion 143 of the lower lever 141 as the coin leaves the chute and passes into the coin box 134. An identical escapement mechanism is used on the coin channel 124.

The coin integrator includes a central shaft 150 upon which is journaled for oscillatory movement a pair of switch arms 151 and 152. These arms extend through suitable slots into the coin channels 124 and 125, respectively, in positions to be engaged by coins passing downwardly through those channels. The arms are normally urged to an initial position as is shown in solid lines in Figure 5 by light hair springs 153. The switch arms cooperate with a series of spaced contact points 154 electrically connected in parallel and carried upon a contact sector 155 formed of suitable insulating material, the switch arms 151, 152 and contact points 154 operating to momentarily make and break an electric circuit once for each unit angular movement of either of the arms 151 or 152 downwardly from their initial position. These unit angular displacements have been selected as representative of the monetary values of the smallest coin which is to be placed in the coin receiving apertures—in the form of the invention shown herein, the unit angular displacement corresponds to a monetary value of five cents.

The location of the arms 151 and 152 and the configuration of the coin channels 124 and 125 are so selected as to cause the arms to be displaced by the movement of coins along the coin channels 124 and 125, the number of units of angular displacement corresponding in each instance to the monetary value of the coins. In other words, a five cent piece will move the arm a single unit displacement, while ten, twenty-five, and fifty cent pieces will move the arm two, five, and ten units, respectively.

The manner in which this result is achieved is understood by assuming a five cent piece to be deposited in the coin aperture 127. This coin, after passing the coin escapement arm 137, strikes a light leaf spring 156 which causes the coin to move to the left as viewed in Figure 5 into engagement with a left edge wall 157 of the coin channel 124. In passing further downwardly through the channel, the coin engages the switch arm 151 and by its own weight causes the arm to move downwardly with the coin. Because of the inclination of the arm, the coin rolls down the channel in engagement with the outer edge wall 157. At the point indicated by the reference character 158 the coin channel widens slightly so that below that point the coin may move past the end of the switch arm 151 as is represented by the coin 159 shown in the dotted lines. The five cent piece then travels without interference through the remainder of the coin channel and the hair spring 153 returns the switch arm 151 to its initial position. The discontinuity 158 is so located as to release the arm 151 while it is engaging the first of the contacts 154 so as to produce a single pulse represented by the closing and subsequent opening of an electric circuit between the first contact point 154 and the switch arm 151.

If a twenty-five cent piece is deposited in the aperture 127 it also passes downwardly through the coin channel 124 and engages the switch arm 151. The switch arm is not released as the twenty-five cent piece passes the discontinuity 158 by reason of the larger diameter of the twenty-five cent coin. Instead, the switch arm is carried past two and into contact with the third of the contact points 154 at which location the coin passes a discontinuity 160 where the channel widens abruptly and sufficiently to allow the coin to pass around the end of the switch arm 151, such position of the coin and switch arm being represented by the coin 161 shown in dotted lines. It will be seen that the switch arm, in advancing into contact with the third contact point and in returning to its original position, will have successively closed and opened the circuit between contact points 154 and switch arm 151 five times so as to produce five pulses of the character hereinbefore mentioned.

A discontinuity 163 allows a fifty cent piece to pass beyond the end of the switch arm 151 after the switch has been moved through an angle sufficient to pass five of the contact points so as to produce ten pulses in moving from and returning to its original position.

A similar arrangement is provided in the coin channel 125, a discontinuity 162 serving to permit a ten cent piece to pass beyond the end of the switch arm 152 after the switch arm has moved past the first contact point to thereby produce two pulses corresponding to the two unit value of the ten cent piece.

The one, two, five or ten pulses produced by the above-described movements of the switch arms 151 and 152 by five, ten, twenty-five and fifty cent pieces are applied to an electromagnet 170 which is connected in a simple series circuit with a battery, switch arms 151 and 152, and contacts 154 and arranged to angularly move an armature 171 upon energization of the magnet 170. The armature 171 carries a pawl 172 which engages a ratchet wheel 173 secured to an indicating disk 174. The ratchet wheel 173 is preferably provided with forty-one uniformly spaced teeth and the indicating disk 174 is similarly divided into forty-one uniformly spaced divisions identified by suitable indicia 175 expressed in five-cent denominations, the indicia 175 covering in five-cent steps the range from zero to two dollars.

It will be seen that each energization of the magnet 170 will rotate the indicating disk 174 one-forty-first of a revolution so as to indicate at a witness point 176 an incremental increase of five cents in the amount of money represented by the angular position of the disk 174. Thus, with the parts in their initial position as shown in Figure 5, the deposit of a five-cent piece will apply to the magnet 170 a single pulse and will notch the indicating disk 174 one notch so as to indicate five cents opposite the witness point 176. Similarly, the deposit of a twenty-five cent piece instead of a five-cent piece will apply five pulses to the magnet 170 and notch the disk 174 through five notches so as to indicate twenty-five cents opposite the witness point 176. If after the deposit of a twenty-five cent piece as described, a ten cent piece is then deposited, the two additional pulses so applied to the magnet 170 will move the disk 174 through two additional angular increments so as to raise the total value indicated from twenty-five cents to thirty-five cents, thus indicating the total amount of money deposited.

As is best shown in Figures 1 and 7, the witness point 176 is preferably inscribed on the front face of the housing 29 immediately above the viewing aperture 34. The indicating disk 174 is placed immediately behind the viewing aperture 34 so that the indicated value may be readily observed through the aperture.

The indicating disk 174 is normally spring biased as by a suitable torsion spring of the clock spring type (not shown) to the initial position shown in Figure 5. A pawl 177 cooperating with the ratchet 173 serves to hold the disk 174 in any of its angular positions. The pawl 177 may be moved to a disengaged position by energization of a second electromagnet 178 which attracts a pivoted armature 179. A tail piece 180 secured to the armature 179 engages an upper end 181 of the pawl 177 which is pivoted as indicated at 182 so that upon energization of the magnet 178 the pawl 177 is rotated in a counterclockwise direction as viewed in Figure 5 and disengaged from the ratchet 173 to allow the return spring to rotate the disk 174 to the initial position as shown. The magnet 178 is energized by circuits shown and described in detail hereinafter in Figure 14 when the program paid for is completed.

It will be seen that the coin receiver and coin integrator just described operate to pass coins of four denominations, one at a time, to the integrating mechanism and deposit those coins ultimately in the coin box 134. It will be seen that during the passage of the coins individually through the integrating mechanism, the indicating disk 174 is rotated through a number of angular increments corresponding to the number of unit values represented by the denomination of the coin so as to indicate opposite the witness point 176 the total monetary value of all of the coins deposited.

Figure 8:
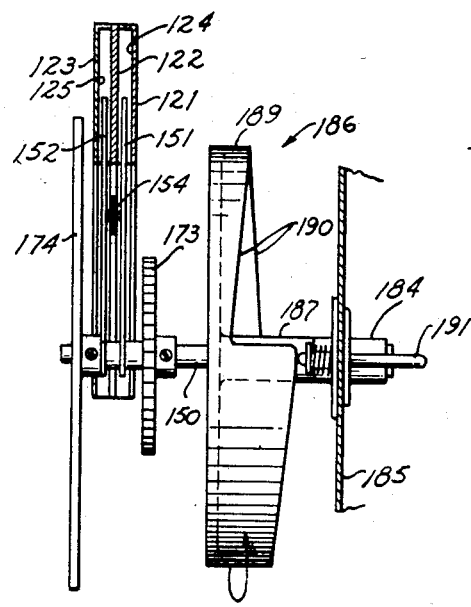
Figure 8 is a fragmentary elevational view illustrating the construction of the cam mechanism constituting a part of the coin interlock.

As is best seen in Figures 7 and 8 the coin integrator 111 just described forms a part of the mechanical structure of the coin interlock 102. As may be seen in Figure 7, the shaft 150 is journaled for rotation in a suitable bearing member carried on the front face member of the housing 29 and is also journaled by a bearing 184 carried by a partition member 185 placed within the housing. The disk 174 and the ratchet wheel 173 are both secured to the shaft 150 so that the shaft 150 is caused to assume an angular position corresponding to the total amount of money indicated by the indicating disk 174.

Also secured to the shaft 150 so as to be rotated thereby is a helical cam member indicated generally by the reference character 186. The cam member 186 may include a central hub portion 187 surrounding the shaft 150 and carrying a disk-like flange portion 188, the outer edge of which is turned to define a cylindrical portion 189. The right hand edge of the cylinder 189 is formed as a single turn helix so as to define a uniform helical cam surface 190 of constant pitch which advances axially a uniform amount for each incremental rotation of the cam member 186.

A movable plunger 191 is mounted for axial sliding movement by a suitable guide member 192 carried by the partition 185. The plunger 191 is headed as shown at 193 and a compression spring 194 interposed between the head 193 and the partition 185 serves to urge the plunger 191 into engagement with the helical cam surface 190.

It will be seen that since the angular position of the helical cam surface 190 depends upon the amount of money deposited in the coin receiving apparatus, the total amount of money so deposited will also be represented by the longitudinal position of the plunger 191. It is this longitudinal position of the plunger 191 which represents the input to the coin interlock 102 from the coin integrator 111 previously described with reference to Figure 4.

The price decoder 89 and its input to the coin interlock 102 described in connection with Figure 4 includes an electromagnet 200 to which the price pulses are applied. The magnet 200 is arranged to attract a pivotally mounted armature 201 which carries a pawl 202 arranged to engage a ratchet wheel 203. The ratchet wheel 203 is suitably secured to a transverse shaft 204 mounted for rotation in suitable journals (not shown) carried by the structure of the housing 29.

Like the coin integrator, the price decoder is arranged to translate pulses representing five cent increments in the price of the program. These pulses, through the medium of the magnet 200, pawl 202 and ratchet wheel 203, serve to rotate the shaft 204 through a number of angular increments equal to the number of pulses transmitted from the transmitting station. Accordingly, the angular position of the shaft 204 is caused to be representative of the price of the program being transmitted.

To shaft 204 there is secured a spiral cam 205 having a peripheral cam surface 206 in the form of an Archimedes spiral. A cam follower 207 is guided in a guide block 208 for axial sliding movement and is held in engagement with the cam surface 206 by means of a compression spring 209 confined between the guide block 208 and a suitable enlargement 210 formed on the cam follower 207. By reason of the spiral form of cam surface 206, the cam follower 207 will be moved through a uniform incremental distance for each incremental rotation of the shaft 204. Thus the axial position of the cam follower 207 is representative of the price of the program.

An interlock member 211 in the form of a bell crank is journaled for angular movement upon a suitable pivot shaft 212. Th interlock member includes a pair of angularly disposed arms 213 and 214 disposed in positions to be engaged respectively by the cam follower 207 and the movable rod 191. The interlock member 211 is normally held by gravity in engagement with the cam follower 207 and is accordingly caused to assume an angular position representative of the price of the program.

Figure 14:
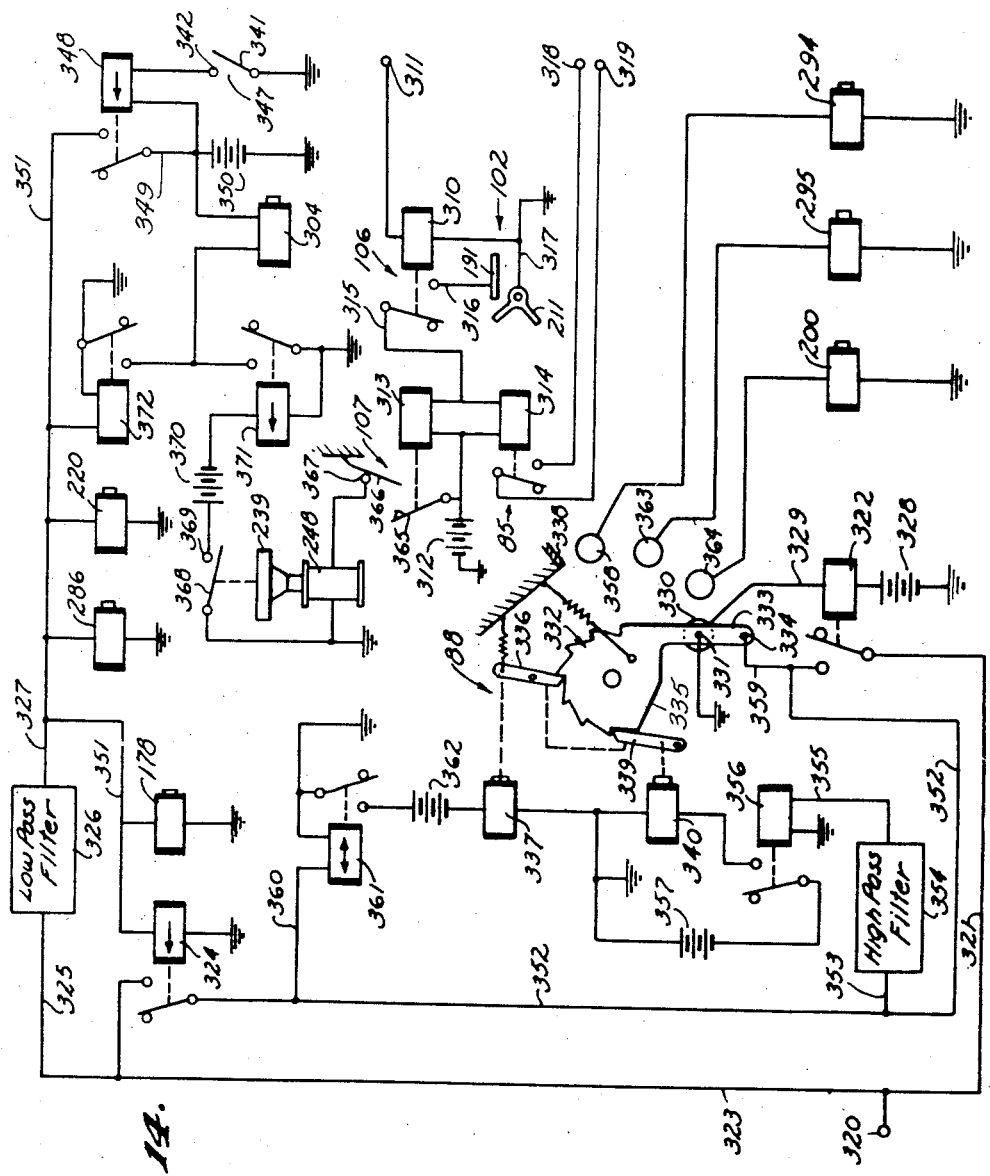
Figure 14 is a schematic wiring diagram of certain of the apparatus used at the receiving stations.

When the amount of money deposited in the coin receiver is of a value equal to the price of the program as represented by the angular position of the interlock member 211, the plunger 191 will be moved thereby to the right and into engagement with the upper arm 214 of the interlock member 211. The resulting electric circuit between the members 191 and 211 is used to indicate that the amount of money deposited is equal to the established price of the program. The way in which this circuit is used in cooperation with the channel interlock 106 to control the recorder actuator 107 and the unscrambler actuator 85 is shown in Figure 14.

At the conclusion of the program paid for, it is necessary to reset the cam 205 to its initial position before the transmission of the next program. To this end, the cam 206 is spring biased as by a suitable torsion spring (not shown) to its initial position, and is arranged to be held in any of its angular positions, by a pawl 215 engaging the ratchet wheel 203. The pawl 215 is pivotally supported as indicated at 216 for movement into and out of engagement with the ratchet wheel 203 and includes a rear extension 217 which overlies a tail piece 218 secured to a pivotally mounted armature 219 disposed in a position to be moved by the energization of a release magnet 220.

Energization of the magnet 220 will thus disengage the pawl 215 from the ratchet 203 and permit the torsion spring to return the cam 205 to its initial position. The electric circuits for actuating the magnets 200 and 220 are shown in Figure 14, to be described hereinafter.

The channel selector 103, recorder 101, and certain auxiliary mechanisms are included in a single unitary assembly illustrated in detail in Figures 9 through 13. As is shown therein, this apparatus comprises a main frame 230 of generally U-shaped form, including depending arm portions 231 and 232. The arm portion 231 is flanged as shown at 233 and secured to the inner surface of the front wall of the housing 29 to support the entire assembly within the housing. The arms 231 and 232 are bored to receive and journal a shaft 234 upon which are mounted three drums 235, 236 and 237, constituting the pre-set recorder inputs of selected channel, time, and date, respectively.

Each of the drums 235—237 are provided with a plurality of radially outwardly extending punch members 238 which are arranged in groups spaced uniformly about the circumference of the drums. Drums 235 and 236 carry twelve such groups corresponding respectively to the twelve channels which may be selected for reception and to the twelve hours of the clock. Drum 237 is provided with sixty such uniformly circumferentially spaced groups corresponding to the arbitrarily numbered days of the sixty-day accounting period. The punch members 238 of each group are spaced axially of each other and may range in number from one to six and be arranged in any of the possible combinations of this variable number of punches with the six possible axial locations of the punch members relative to each other. Thus each of the groups of punch members on each drum may be individually unique as to that drum so as to represent according to a predetermined code the numerals 1 to 12 in the cases of the drums 235 and 236 and the numerals 1 to 60 in the case of the drum 237.

Below the drums 235—237 there is provided a movable die member 239 which is provided with three groups of die openings 240, 241 and 242, for receiving the punch members 238 upon movement of the die member 239 upwardly into engagement with the underside of the drums. Between the die member 239 and the underside of the drums 235—237 there is passed a tape 243 formed of paper or other suitable material so that openings will be punched in the tape 243 by upward movement of the die member 241.

Die member 239 is guided for reciprocating movement toward and away from the drums 235—237 by means of guide rods 244 and 245 secured in the extremities of the die member 239 and slidably received in suitable apertures formed in brackets 246 and 247 carried by the main frame 230. Controlled movement of the die member 239 as described is effected by a solenoid 248 arranged upon energization to lift the die member 239 and punch the tape as described.

In order that the holes punched in the tape 243 will properly designate the channel selected and the date and time of operation, it is of course necessary that the drums 235—237 be placed in the proper angular position at the time solenoid 248 is energized. The drum 235, representative of the channel selected, is positioned through operation of the dial 31. Dial 31 is secured to the shaft 234 and cooperates with a finger stop 249 so that the shaft 234 may be rotated to a desired angular position by the insertion of a finger in a hole in the dial bearing the number of the channel to be selected and by this means rotating the dial until the finger engages the stop 249. The rotation of the dial rotates the shaft 234 and correspondingly rotates the channel drum 235 which is secured to the shaft 234 as by means of a pin 250.

A torsion spring 251 housed beneath the dial 31 serves to normally urge the dial 31, shaft 234 and drum 235 to the initial position shown in Figure 9. However, when the dial is operated as described, the parts are held in position by a spring detent 252 positioned to engage suitable notches 253 formed in the face of the drum 235. The detent member 252 is provided with one face 254 perpendicular to the direction of movement of the drum and one sloping face 255. The detent 252 is mounted upon a relatively flexible leaf spring member 256 so that as the drum 235 is rotated by the dial 31, engagement of the side walls of the notches 253 with the sloping face 255 will force the detent out of the notches to permit the drum to be rotated. Reverse movement of the drum under the urging of the spring 251 is prevented by the engagement of the notch 253 with the perpendicular detent face 254.

After the tape 243 has been punched by energization of the solenoid 248, the detent 252 is withdrawn to allow the spring 251 to return the dial 31 and drum 235 to the initial position. This is accomplished by a lever 257 which is pivoted as at 258 and connected at one end as shown at 259 to the die member 239. The other end of the lever 257 carries a vertically reciprocal cam member 260 having an upper end 261 so formed as to cooperate with a depending portion 262 of the spring 256 and force the detent 252 out of the notch 253 upon the return of the die member 239 to its normal position after the tape is punched.

As mentioned in the description of the apparatus shown in Figure 4, the channel selector is arranged also to control the operation of the control signal separator 83 through the selection of a suitably tuned circuit or by completing a suitable control circuit to thereby adjust the separator 83 to accept control signals transmitted on the selected channel. This function is performed by a rotary switch indicated generally in Figure 11 by the reference character 270. The switch 270 includes a stationary member 271 formed of insulating material having twlve contact segments 272 spaced uniformly thereabout. A movable contact member 273 is mounted upon a ratchet wheel 274 so as to rotate therewith.

The ratchet wheel 274 is provided with an axially extending pin 275 adapted to be engaged by an inwardly turned end 276 of a crank arm 277 secured to the shaft 234 as by pin 278. Rotation of the shaft 234 through use of the dial 31 causes rotation of the ratchet wheel 274 by reason of the engagement of the crank 277 with the pin 275. This rotation of the ratchet wheel 275 brings the movable contact 273 into engagement with the corresponding one of the stationary contacts 272. The movable contact 273 and the stationary contacts 272 may be connected in conventional circuits with a group of acceptor circuits comprising the control signal separator 83, such circuits being conventional and well understood and for that reason not illustrated herein.

The ratchet wheel 274 is spring-urged to the normal or initial position illustrated in the drawings as by a torsion spring 279 of the clock spring type, and is normally held against return to the normal position by a pawl 280 which is pivotally mounted as at 281 in a position to engage the teeth of the ratchet, the pawl 280 being urged to ratchet-engaging position by a spring 282 interposed between a pawl extension 283 and a support 284 carried by a supporting plate 285 suitably secured to the main frame 230. A release magnet 286 is also carried by the support 285 and is arranged upon energization to move a pivoted armature 287, the outer end of which overlies and engages the pawl extension 283 to depress the pawl extension and disengage the pawl from the ratchet 274, thereby allowing the spring 279 to restore the ratchet and the movable switch contact 273 to the initial or off position. As will be more apparent from a consideration of the wiring diagram shown in Figure 14, the release magnet 286 is arranged to be energized at the conclusion of the selected program.

The time and date drums 236 and 237 are arranged to be moved to positions properly representative of the current date and time by electromagnets responding to the date and time pulses and arranged to move the drums to corresponding positions. The drive mechanism for so rotating the date drum 237 is shown in Figure 13 and a precisely similar arrangement is used to drive the drum 236.

As is shown in Figure 13, the date drum 237 includes a smaller diameter portion 290 upon which are formed ratchet teeth 291. These ratchet teeth are sixty in number and are adapted to be engaged by a movable pawl 292 carried upon a pivoted armature 293 which is adapted to be moved upwardly as viewed in Figure 13 by the energization of a magnet coil 294. By this structure, the drum 237 is rotated from its initial position to a position dependent upon the number of impulses applied to the magnet 294 and representing in number the arbitrarily assigned ordinal of the current date of transmission.

A precisely similar drive including an electromagnet 295 is used for the time drum 236 except that the ratchet wheel 296 therefor is divided into twelve segments, one for each hour of the day, instead of the sixty teeth used on the ratchet wheel 290. Both of the drums 236 and 237 are spring-urged as by torsion springs 297 and 298 to their initial position, and are held against movement under the influence of such torsion springs by detent pawls 301 and 302. The pawls 301 and 302 are secured to a rock shaft 303 for movement from a holding position such as illustrated in Figure 13 to a released position allowing the drums to return to their normal position. The rock shaft 303 is arranged to be so angularly moved by the energization of a release magnet 304 which includes an armature 305 carrying a tailpiece 306 extending into engagement with a lever 307 secured to the rock shaft 303. The one magnet 304 is thus arranged to effect, upon energization, the return of both the date drum 237 and the time drum 236 to their initial positions.

Figure 14 is a schematic wiring diagram illustrating the electrical circuits employed for interconnecting the various electrical instrumentalities mentioned in connection with the description of Figures 5 through 13. In Figure 14 conventional symbols have been employed for indicating the electromagnets, relays and the like. Certain time delay relays are included in the circuits and these are shown in the diagram by conventional symbols carrying an arrow placed within the rectangle representing the relay coil. The direction indicated by the arrow is intended to represent the direction of actuation of the relay in which the response is slow or delayed.

It is believed that the arrangement of the circuits and their mode of operation can best be understood by assuming certain operating conditions, and tracing the functions through the circuit in accordance with those assumptions. Accordingly, let it be assumed that all parts occupy their normal positions, and that the user of the system has tuned in the channel of his choice on his television receiver. The user next manipulates the dial 31 to set the channel selector 103 for the previously chosen channel. It will be recalled that this results in setting the selector switch 270 so as to cause the control signal separator 83 to accept the control signals being transmitted on the selected channel. These accepted control signals produce an output signal on the movable switch arm 273, and this signal is applied to a channel interlock relay 310 through an input terminal 311, the relay 310 being connected in circuit between the input terminal 311 and ground.

The signal developed at the output of the control signal separator 83 thus actuates the relay 310, causing it to close its contacts and prepare a circuit extending from ground through a battery 312, coils 313 and 314 of a recorder actuator relay and an unscrambler actuator relay (the coils 313 and 314 being connected in parallel), and conductors 315 and 316 to the movable plunger member 191 of the coin interlock 102. The other member 211 of the coin interlock is grounded as indicated at 317. It will be seen that when the plunger 191 is moved into contact with the bell crank member 211 as described hereinafter, the above described circuit will be completed to energize the relay coils 313 and 314. Contacts of the relay 314 are connected across terminals 318 and 319 which are understood to be so connected to the unscrambler 79 as to complete a controlling circuit in the unscrambler and render the unscrambler operative when the contacts of the relay 314 are closed.

As hereinbefore described the engagement of the movable plunger 191 with the bell crank 211 depends upon the proper positioning of these two members, the position of the plunger 191 being controlled by the value of the coins placed in the coin collecting apparatus, and the position of the bell crank 211 being controlled by the price pulses which are radiated from the selected transmitting station and which actuate the pricing magnet 200. The circuits and apparatus for so energizing the magnet 200 will now be described.

As is shown in Figure 15, a momentary contact switch comprising a pair of electrical contacts mounted upon light springs 341 and 342 is carried by a switch base 343 suitably secured to the mounting flange 233 of the main frame 230. The channel drum 235, which is driven from the dial 31, carries a switch operator 344 adapted to engage the switch contact 341 and move it into engagement with the contact 342 when the drum 235 is moved by the dial 31 in the direction indicated by the arrow 345. The flexible nature of these contacts permit the switch operator 344 to snap past the contact 341 as the dial is further rotated. Upon returning movement of the dial in the direction indicated by arrow 346, the engagement of the switch operator 344 with the spring contact 341 moves the contact further away from its associated contact 342. Thus the contacts 341 and 342 are closed momentarily upon the manipulation of the dial to select a chosen channel, but are not operated by the return of dial to its normal position.

The contacts 341 and 342 comprise a momentary contact switch 347 (Figure 14) which is connected in a circuit extending from ground through the switch 347, through the coil of a resetting relay 348, and by way of conductor 349 through a battery 350 to ground. Contacts of the relay 348 are connected between the ungrounded terminal of the battery 350 and a resetting bus 351. The resetting relay 348 has a slow release characteristic so that the momentary closing of the dial switch 347 serves to connect the battery 350 to the reset bus 351 for a definite time dependent upon the slow release characteristic of the relay 348. This characteristic is adjusted so as to connect the battery 350 to the reset bus 351 for a length of time equal to the duration of the normal resetting pulse shown in Figure 3.

The resetting pulse thus applied to the bus 351 energizes a releasing relay 324, the coil of which is connected between the reset bus 351 and ground.

It will be recalled that all of the pulse signals represented by Figure 3 of the drawings are separated by the pulse separator 87 and applied to a pulse distributor 88. The pulses so extracted will be understood to be applied to an input terminal 320 shown in Figure 14. The terminal 320 is connected by a conductor 323 to contacts of the releasing relay 324 which, by their closing, connect conductor 323 to a conductor 352 so that the pulses appearing on the input terminal 320 now appear on the conductor 352.

The conductor 352 is connected as shown at 353 to a high pass filter 354. The filter 354 is so constructed as to produce upon an output conductor 355 an appreciable signal only when the shortest duration pulse appears on the input terminal 320, such pulse constituting the synchronizing or start pulse shown in Figure 3. The relay 324 is of the time delay type providing a slow release characteristic to insure that its contacts will remain closed for a sufficient length of time to permit at least one of the synchronizing pulses to be transmitted and applied to the high pass filter 354 before the contacts of the relay 324 open. The signal thus produced on the output conductor 355 serves to energize a relay 356, contacts of which are connected in circuit with a battery 357 and a release coil 340 of a ratchet relay 332.

The ratchet relay 332 includes a movable arm 333 carrying a grounded movable contact 331 and a second movable contact 334. The movable arm 333 is secured to a ratchet sector 335 adapted to be driven by a driving pawl 336 actuated by a driving magnet 337. The ratchet sector is normally spring urged to a starting position disposing the arm 333 in engagement with a stop member 338, the magnet 337 and pawl 336 operating to notch the sector around and move the arm from the starting position described to a final or locked position such as is shown in the drawings, a holding pawl 339 being employed to hold the ratchet sector 335 against return until withdrawn by the energization of the release magnet 340. Thus, at the start of the operation of the system under the assumed conditions, the ratchet switch 332 is held in its locked position as shown in Figure 14 by the holding pawl 339.

The energization of the release coil 340 resulting from the closing of the contacts of the relay 356 withdraws the pawl 339 and allows the ratchet relay 332 to be spring returned to its starting position placing the movable arm 333 in engagement with the stop member 338, and engaging the movable contact 334 with a stationary contact 358. The stationary contact 358 is connected to the magnet coil 294 which serves to actuate the date drum 237 in the recording apparatus. This movement of the switch arm 333 to its starting position also interrupts a circuit extending from ground through a battery 328, the coil of a lockout relay 322, and a conductor 329 which is connected to a stationary contact 330 of the rotary switch mechanism, the stationary contact 330 being up to this time engaged by the grounded movable contact 331.

The de-energization of the lockout relay 322 resulting from the resetting of the ratchet relay 332 allows the lockout relay 322 to close its normally closed contacts. These contacts are connected between the conductor 352 and a conductor 321 connected to the terminal 320 so that pulses appearing on the input terminal 320 will be applied thereafter to the conductor 352 even though the contacts of the relay 324 subsequently open.

The conductor 352 is also connected as shown at 359 to the movable ratchet relay contact 334 so that in the starting position thereof pulses appearing on the input terminal 320 immediately following the synchronizing pulse are passed to the stationary contact 358 and applied to the magnet 294. With reference to Figure 3, it will be seen that the first series of pulses following the synchronizing pulse are the pulses representative of the date of the transmissions, and the magnet 294 is accordingly pulsed to properly set the date drum 237 of the recording apparatus.

The date pulses are also applied by way of a conductor 360 to a distributor relay coil 361. The distributor relay 361 is of the slow pickup and slow release type so as to close its contacts sometime after the application of the first date pulse thereto, and to hold those contacts closed during the periods between successive pulses of a given group. The relay 361 is thus actuated only once for the entire series of date pulses, being energized at the beginning of those pulses and de-energized after the entire group is received.

The normally closed contacts of the relay 361 are included in a circuit extending from ground through the relay contacts and through a battery 362 to the actuating magnet 337 of the ratchet switch 332, the other terminal of the actuating magnet 337 being grounded as shown. The contacts of the relay 361 being of the normally closed type, the described circuit to the actuating magnet 337 is completed at the end of the transmission of the entire group of date pulses, to then notch the ratchet relay one notch and engage its movable contact 334 with a stationary contact 363 which is connected to the actuating magnet 295 for rotating the time drum of the recording apparatus.

The next group of pulses representing the time of the transmissions are thus applied to the magnet 295 and also serve to energize the distributor relay 361 so that after this entire group of pulses is transmitted, the actuating magnet 337 will be energized to notch the ratchet relay 332 to a third position connecting the movable contact 334 thereof with the third stationary contact 364. The stationary contact 364 is connected to the magnet 200 which serves to operate the price decoder and set the price interlock member 211 to a position corresponding to the price of the program. As before, this group of price pulses energizes the relay 361 and operates the ratchet relay 332 after all of the price pulses have been applied to the magnet 200.

The third and final operation of the ratchet relay 332 brings it to the locked position shown in Figure 14, completing the circuit to the lockout relay 322 and opening the relay contacts so as to isolate the conductor 352 from the input terminal 320. Pulses received after the operation of the lockout relay 322 are ineffective because the circuit to the conductor 352 is opened at the contacts of the lockout relay 322 and at the contacts of the release relay 324.

It will be seen that the user of the system, merely by tuning in the chosen channel and setting the dial 31 to that channel, has caused the setting of the channel, date, and time drums of the recording apparatus, to positions properly indicative of the selected channel and the date and time of the transmissions, and has caused the coin interlock member 211 to be moved to a position corresponding to the established price of the program. The apparatus is now conditioned to receive the coins deposited in payment for the program to be received. These coins are counted and their value integrated by the coin integrator so as to move the plunger 191 to a position representative of the monetary value of the coins deposited.

The deposit of coins in an aggregate value equal to the determined price of the program moves the plunger 191 into engagement with the coin interlock member 211 so as to complete the electric circuit 315—317 and energize the relays 313 and 314. The energization of the relay 314 interconnects terminals 318 and 319 and renders the unscrambling device 79 operative so as to render intelligible the program received on the television receiver. The energization of the relay 313 is intended to operate the recorder actuator 107 and this is accomplished by the circuits described in the ensuing paragraphs.

The contact structure of the relay 313 includes a movable contact member 365, a spring contact member 366 and a fixed contact member 367. The fixed contact member and spring contact member 366 occupy a normally closed relation, and the movable contact member 365 has a normally open relation to the spring contact member 366. Energization of the relay coil 313 first moves the contact 365 into engagement with the spring contact member 366 and then depresses the spring contact 366 so as to thereafter move that contact out of engagement with the fixed contact 367, thus momentarily completing a circuit between the contacts 365 and 367. These contacts, during their closed period, connect the battery 312 to the solenoid 248 which lifts the recorder die member 239 and perforates the recording tape. The solenoid 248 is immediately de-energized to allow the die member 239 to return to its initial position. In this way, a permanent record is made of the channel selected and the date and time of the selection of that channel.

The operation of the die member 239 also serves to momentarily engage a contact member 368 (see also Figure 14) with a stationary contact member 369 so as to momentarily complete an electrical circuit including a battery 370 and a relay 371. The relay 371 is of the slow-to-make type so that its contacts are not closed until the returning die member 239 has had time to disengage the recorder tape from the punching elements 238. After this time has elapsed, the contacts of the relay 371 close to complete a circuit extending from the battery 350 through the release magnet 304 of the recorder mechanism. Energization of this release magnet allows the date and time drums of the recording apparatus to return to their initial positions.

By the instrumentalities and functions thus far described, the receiving device has been placed in operation, the program, material presented thereon rendered intelligible, the requisite amount of money corresponding to the established price of the program collected, and a permanent record made of the channel selected and the date and time of that selection. The apparatus then remains quiescent until the end of the program, at which time a resetting pulse such as shown in Figure 3 appears on the input terminal 320.

The resetting pulse is applied by a conductor 325 to a low pass filter 326 which is so arranged as to apply to the resetting bus 351 a signal of appreciable magnitude only when one of the resetting pulses shown in Figure 3 appears on the conductor 325. This pulse energizes the releasing relay 324 as hereinbefore described, and energizes also the release magnets 178, 286 and 220 to release and return to normal the control signal separator selector 270, the coin integrator disk 174 and movable plunger 191, and the price cam and follower 205, 207 which control the positioning of the coin interlock member 211.

The resetting pulse also energizes a relay 372, the contacts of which are connected to energize the date and time drum release magnet 304 so as to reset the date and time drums.

It is seen that at the conclusion of the program paid for, all of the instrumentalities are returned to their normal condition as is represented by the positions of the various parts shown in Figure 14, so that a subsequent use of the system follows the same sequence of operations as has just been described. Furthermore, any manipulation of the dial 31 during the course of the reception of the paid program (an attempt to receive a different paid program, for example), produces a resetting pulse and immediately returns all of the instrumentalities to their normal positions so as to require the deposit of additional coins in order to secure further operation.

After each operation of the recorder solenoid 248 to punch the tape, the tape is moved to present a new unpunched area for receiving the next set of perforations.

Such movement of the tape may be effected by any suitable drive means such as, for example, a ratchet device for rotating a take-up reel in response to reciprocation of the die member 239, fresh and unperforated tape being drawn thereby from a suitable supply reel.

It will be understood that the housing 29 of the attachment 27 is provided with a door or removable cover to provide access to the interior, and that a suitable lock is employed to prevent access by persons other than authorized representatives of the program distributing organization providing and distributing the entertainment material. It is contemplated that such representatives will visit each receiving station from time to time and remove the coins from the coin box 134 and remove so much of the record tape as has been perforated since the previous visit.

At a suitable central location or accounting office, the short sections of record tape taken from the receiving stations may be spliced together to form one or more longer continuous tapes. These tapes may be fed through well known types of electrical posting and tabulating machines to determine the proper distribution of the coins among the various suppliers of the entertainment distributed during the period of time covered by the record tapes, it being understood that the recorded data (channel selected, and date and time of selection) completely identifies the program paid for and that the price data obtainable from each transmitting station completes the data required for such distribution.

From the foregoing, it will be observed that the present invention provides a prepaid entertainment distribution system which is particularly adapted to the distribution of entertainment material through electromagnetic radiation such as is used in the transmission of radio and television programs. Attention is directed particularly to the coin control apparatus which makes possible variations in the price of the various programs to correspond to the quality and duration of the programs, and which also functions to maintain a permanent record of all of the data necessary for a proper allocation of the received monies among the various persons, organizations, and the like supplying the entertainment material. It will be noted that the apparatus has been so constructed and arranged as to make the adaptation to existing receiver installations as simple as possible, and so as to require a minimum of change or alteration of the receiving apparatus, thus adapting the system particularly to use with existing radio and television broadcasting systems and allowing the apparatus to be readily attached and operatively connected with existing radio and television receivers in homes and like locations. Attention is again directed to the fact that such adaptation of existing receiver installations does not in any way interfere with the normal use of the receivers and permits the reception at any time of any free programs which may be available.

It should also be pointed out that free programs may be transmitted at any time from any of the secret transmitters merely by taking out of operation the secrecy preserving and controlling apparatus. This permits not only the presentation of free programs but allows the distribution of non-secret announcements, "trailers," and advertisements designed to persuade users to make greater use of the entertainment facilities offered.

While the preferred embodiment of this invention has been shown and described, the same is not to be limited to the details illustrated and specifically mentioned herein, except as defined in the appended claims.

We claim:

1. In a receiving system of the character described for receiving program signals as well as a series of code signals representative of the value of the transmitted program and a series of code signals identifying the program, means for receiving the first and second mentioned code signals and deriving therefrom respectively a first series of pulses representing the monetary value of the program and a second series of pulses for identifying the program, coin operated mechanism, said mechanism incorporating means for developing a third series of pulses representative of the amount of coinage deposited in said mechanism, comparator means operated by said first and third series of pulses jointly, recording means, said comparator means incorporating means for rendering said recording means effective to produce a recording in accordance with said second series of pulses when said first series and said third series of pulses are in predetermined amounts.

2. In a receiving system of the character described for receiving program signals as well as the series of code signals representative of the value of a transmitted program and a series of code signals for identifying the program, means for receiving the first and second mentioned code signals and for deriving therefrom respectively a first series and a second series of pulses corresponding to the monetary value of the program and identifying the program, recording means, comparator means incorporating a coin operated mechanism for rendering said recording means inoperative, said comparator means being operated by said first series of pulses to establish a coin demand, said coin operated mechanism incorporating means for developing a third series of pulses representing the amount of coinage deposited in said mechanism and for applying said third series of pulses to said comparator means, said comparator means including means for rendering said recording means effective to produce a recording in accordance with said second series of pulses responsive to said first and third series of pulses representing corresponding amounts of coinage.

3. In a receiving system of the character described for receiving program signals as well as the series of code signals representative of the value of a transmitted program and code signals identifying the program, means for receiving the first and second mentioned code signals and deriving therefrom respectively a first series of pulses representing the monetary value of the program and a second series of pulses identifying said program, comparator means, means for applying said first series of pulses to said comparator means to establish a coin demand, coin operated mechanism incorporating means for developing a third series of pulses representing the amount of coinage deposited in said coin operated mechanism, means for applying said third series of pulses to said comparator means, recording means, said comparator means normally rendering said recording means ineffective, said comparator means incorporating means for comparing the first and third series of pulses and for rendering said recording means operative to effect a recording in accordance with the second series of pulses responsive to said first and third pulse series corresponding to equal amounts of coinage.

4. In a receiving system of the character described for receiving program signals as well as a series of code signals representative of the value of a transmitted program and code signals identifying the program, means for receiving the first and second mentioned code signals and deriving therefrom a first series of pulses representative of the value of the program and a second series of pulses identifying the program, comparator means, pulse selection means for selecting only said first series of pulses and for applying said first series of pulses to said comparator means to establish a coin demand, coin operated mechanism operatively associated with said comparator means for developing a third series of pulses in accordance with the amount of coinage deposited in said coin operated mechanism, means applying said third series of pulses to said comparator means, said comparator means incorporating means which is actuated upon correspondence between said first and third series of pulses, and recording means, rendered operative responsive to said means which is actuated upon correspondence between said first and third series of pulses to produce a recording in accordance with said second series of pulses.

5. In a receiving system of the character described for receiving program signals as well as a series of code signals representative of the value of a transmitted program and code signals identifying the program, means for receiving said first and second mentioned code signals and for deriving therefrom respectively a first series of pulses representing the monetary value of the program and a second series of pulses identifying the program, comparator means, pulse selection means, said pulse selection means incorporating means whereby only all pulses of said first series are applied to said comparator means, said comparator means incorporating means coupled to said pulse selection means for establishing a coin demand, coin operated mechanism operatively associated with said comparator means and incorporating means for developing and applying to said comparator means a third series of pulses representing the amount of coinage deposited in said coin operated mechanism, recording means, means in said comparator to enable said recording means responsive to the amount established by said coin demand means and the amount of coinage represented by said third series of pulses being equal, said recording means being coupled to said pulse selection means, said pulse selection means incorporating means whereby the recording is made only in accordance with all pulses in said second series.

6. A television receiver incorporating means for receiving program signals and signals including recurrent complete series of pulses each representing the momentary value of the program on at least one carrier, means for receiving and demodulating said carrier to derive from said signals said recurrent complete series of pulses representing the momentary value of the program, comparator means, pulse selection means, said pulse selection means incorporating means whereby only one complete series of said recurrent complete series of pulses is applied to said comparator means to operate the same, said comparator means being thereby rendered insensitive to pulses in succeeding recurrent complete series of pulses once a complete series of said pulses operates the same, coin operated mechanism operatively associated with said comparator means for developing and applying pulses to said comparator means representative of the amount of coinage deposited in said coin operated mechanism, means to indicate a correspondence between said one complete series of pulses and said pulses from said coin operated mechanism and a utilization device rendered operative responsive to said correspondence indicating means.

7. A television receiver for receiving program signals as well as signals representing the value of a program and signals identifying the program on at least one carrier, said signals being transmitted continuously during the transmission of all of the program and contemporaneously therewith, means for receiving said carrier and for demodulating said carrier to produce said signals representing the value of the program and said signals identifying the program, comparator means, signal selecting means coupled to said comparator means and applying to said comparator means only those signals representing the value of the program, said comparator means being rendered insensitive to the last-mentioned signals after operation by said last-mentioned signals, coin operated mechanism operatively associated with said comparator means for developing and applying to said comparator means a signal representing the amount of coinage deposited in said coin operated mechanism, said comparator means including means to indicate a correspondence between the value of the program and the amount of coinage deposited in said coin operating mechanism, recording means actuated responsive to an indication from said means to indicate a correspondence, said signal selecting means being coupled to said recording means for applying to said recording means only those signals identifying the program, said recording means being rendered insensitive to said signals identifying said program after a recording has been made in accordance with said program identifying signals.

8. In a receiving system of the character described for receiving coin demand signals which are transmitted simultaneously with program signals and for the duration of the program represented by said program signals, said coin demand signals comprising pulses in a modulated carrier wave, means for demodulating said carrier wave to derive said coin demand pulses, said coin demand pulses appearing recurrently in a series with the total number of pulses in one of said series representing the value of the program, comparator means, pulse selection means coupled to said comparator means for applying thereto only one complete series of said coin demand pulses to operate said comparator means, said comparator means being rendered insensitive to further pulses in a succeeding series once the comparator means is operated by a complete series of pulses, coin operated mechanism operatively associated with said comparator means for developing and applying to said comparator means a series of pulses, which in amount, represents the amount of coinage deposited in said coin operated mechanism, and said comparator means having means associated therewith which is operated when there is a correspondence between said coin demand pulses and the pulses developed by the coin operated mechanism.

9. In a system wherein there is transmitted recurrently a series of pulses representing a coin demand, a receiving system for said pulses comprising comparator means, means applying said pulses to said comparator means, means rendering said comparator means sensitive to only one complete series of said pulses, coin operated mechanism associated with said comparator means for developing and applying to said comparator means pulses representing the amount of coinage deposited in said coin operated mechanism, and means associated with said comparator means and operated when there is correspondence between the number of said transmitted coin demand pulses and the number of said pulses developed by said coin operated mechanism to provide an indication of said correspondence.

References Cited in the file of this patent

UNITED STATES PATENTS

| | | |
|---|---|---|
| 1,498,544 | Fowler | June 24, 1924 |
| 1,626,807 | Gardner | May 3, 1927 |
| 1,661,748 | Chauveau | Mar. 6, 1928 |
| 2,000,804 | Wehren | May 7, 1935 |
| 2,082,561 | Appelius | June 1, 1937 |
| 2,093,988 | Appelius | Sept. 28, 1937 |
| 2,177,788 | Ross | Oct. 31, 1939 |
| 2,269,856 | Nelsen | Jan. 13, 1942 |
| 2,300,595 | Rix | Nov. 3, 1942 |
| 2,338,853 | Hull | Jan. 11, 1944 |
| 2,366,469 | Andres | Jan. 2, 1945 |
| 2,433,689 | Fry | Dec. 30, 1947 |
| 2,526,512 | Snell | Oct. 17, 1950 |
| 2,573,349 | Miller | Oct. 30, 1951 |

FOREIGN PATENTS

| | | |
|---|---|---|
| 358,176 | Great Britain | Oct. 8, 1931 |